(12) United States Patent
Choi et al.

(10) Patent No.: US 9,905,835 B2
(45) Date of Patent: Feb. 27, 2018

(54) SECONDARY BATTERY PACK

(71) Applicant: LG CHEM, LTD., Seoul (KR)

(72) Inventors: Jong Woon Choi, Cheongju-si (KR); Seog Jin Yoon, Cheongwon-gun (KR); Youngjoo Cha, Cheongwon-gun (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/032,494

(22) Filed: Sep. 20, 2013

(65) Prior Publication Data

US 2014/0023885 A1 Jan. 23, 2014

Related U.S. Application Data

(63) Continuation of application No. PCT/KR2012/006131, filed on Aug. 1, 2012.

(30) Foreign Application Priority Data

Aug. 12, 2011 (KR) .......................... 10-2011-0080667
Feb. 14, 2012 (KR) .......................... 10-2012-0014803

(51) Int. Cl.
*H01M 2/34* (2006.01)
*H01M 2/10* (2006.01)
(Continued)

(52) U.S. Cl.
CPC .............. *H01M 2/34* (2013.01); *H01M 2/021* (2013.01); *H01M 2/0212* (2013.01);
(Continued)

(58) Field of Classification Search
CPC ....... H01M 10/4257; H01M 2010/425; H01M 2/0287; H01M 10/0486; H01M 2/34;
(Continued)

(56) References Cited

U.S. PATENT DOCUMENTS 6,632,256 B1 * 10/2003 Ishizaki .............. H01M 2/0212
29/623.3
7,887,949 B2 2/2011 Yoon
(Continued)

FOREIGN PATENT DOCUMENTS

CN 100481578 C 4/2009
EP 1 717 882 B1 1/2011
(Continued)

OTHER PUBLICATIONS

English Machine Translation of Choi KR20090077135, also known as KR10-2009-0077135, Jul. 2009.*
(Continued)

*Primary Examiner* — Lisa S Park
(74) *Attorney, Agent, or Firm* — Nutter McClennen & Fish LLP; John J. Penny, Jr.

(57) ABSTRACT

Disclosed is a secondary battery pack including a battery cell having an anode and a cathode terminal formed at one face having a sealed surplus portion and a protection circuit module (PCM) electrically connected to the battery cell via the anode and the cathode terminal, wherein the PCM includes a board having a protection circuit formed thereon, the board being provided with an anode terminal connection part and a cathode terminal connection part connected to the anode terminal and the cathode terminal, respectively, the board is coupled to the anode terminal and the cathode terminal of the battery cell via the anode terminal connection part and the cathode terminal connection part and is mounted to the sealed surplus portion of the battery cell, and the secondary battery pack further includes a frame mounted to the PCM and the battery cell so as to surround the PCM and the battery cell.

10 Claims, 8 Drawing Sheets

(51) Int. Cl.
   *H01M 10/42* (2006.01)
   *H01M 2/02* (2006.01)

(52) U.S. Cl.
   CPC ....... *H01M 2/1022* (2013.01); *H01M 2/1066* (2013.01); *H01M 10/425* (2013.01); *H01M 2200/00* (2013.01); *Y10T 29/4911* (2015.01)

(58) Field of Classification Search
   CPC .... H01M 2/266; H01M 2/021; H01M 2/0212; H01M 2/1066; H01M 2/344; H01M 2/1022; H01M 10/425; H01M 2200/00; Y10T 29/4911
   See application file for complete search history.

(56) References Cited

U.S. PATENT DOCUMENTS

| | | | |
|---|---|---|---|
| 2005/0282069 A1* | 12/2005 | Kim | H01M 2/021 429/185 |
| 2006/0199075 A1* | 9/2006 | Moon et al. | 429/176 |
| 2006/0266542 A1* | 11/2006 | Yoon | 174/112 |
| 2007/0154784 A1* | 7/2007 | Seo | 429/61 |
| 2009/0029239 A1* | 1/2009 | Koetting | H01M 2/0212 429/82 |
| 2009/0111018 A1* | 4/2009 | Park | H01M 2/0207 429/179 |
| 2010/0092861 A1 | 4/2010 | Kim | |
| 2011/0059345 A1* | 3/2011 | Kim | H01M 2/0212 429/120 |
| 2011/0086242 A1* | 4/2011 | Lee | H01M 2/021 429/7 |
| 2012/0276420 A1 | 11/2012 | Baek et al. | |

FOREIGN PATENT DOCUMENTS

| | | |
|---|---|---|
| JP | 2005-135837 A | 5/2005 |
| JP | 2008-159555 A | 7/2008 |
| JP | 2009-252371 A | 10/2009 |
| JP | 2010-182598 A | 8/2010 |
| JP | 2011-70906 A | 4/2011 |
| JP | 2013-514626 A | 4/2013 |
| KR | 10-2006-0113802 A | 11/2006 |
| KR | 10-0813812 B1 | 3/2008 |
| KR | 10-2009-0031158 A | 3/2009 |
| KR | 10-2010-0121336 A | 11/2010 |
| KR | 10-0995429 B1 | 11/2010 |
| KR | 10-2011-0066774 A | 6/2011 |
| TW | 200937697 A | 9/2009 |
| WO | WO 2006/078103 A1 | 7/2006 |
| WO | 2010/128812 A2 | 11/2010 |
| WO | 2011/078536 A2 | 6/2011 |

OTHER PUBLICATIONS

International Search Report issued in PCT/KR2012/006131, dated Jan. 24, 2013.
European Search Report dated Apr. 17, 2015 for Application No. 12824037.1.

\* cited by examiner

SECONDARY BATTERY PACK

CROSS REFERENCE TO RELATED APPLICATIONS

This application is a Bypass Continuation of PCT International Application No. PCT/KR2012/006131 filed on Aug. 1, 2012, which claims priority under 35 U.S.C §119(a) to Patent Application No. 10-2011-0080667 filed in the Republic of Korea on Aug. 12, 2011, and to Patent Application No. 10-2012-0014803 filed in the Republic of Korea on Feb. 14, 2012, all of which are hereby expressly incorporated by reference into the present application.

TECHNICAL FIELD

The present invention relates to a secondary battery pack.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as various kinds of mobile devices.

Depending upon kinds of devices in which secondary batteries are used, the secondary batteries may be configured to have a detachable type structure in which the secondary batteries can be easily inserted into and removed from external devices or to have an embedded type structure in which the secondary batteries are embedded in the devices. For example, secondary batteries used in the conventional mobile devices are configured to have a detachable type structure in which it is possible for a user to insert or remove a battery into or from each device. On the other hand, secondary batteries used in devices, such as some mobile phones, tablet PCs, and smart pads, may be configured to have an embedded type structure.

Lithium secondary batteries are widely used as such secondary batteries. Each of the secondary batteries includes an anode terminal and a cathode terminal electrically connected to a device, in which the secondary battery is mounted, and a safety element to effectively control an abnormal state, such as overcharge or overcurrent, of the secondary battery. Examples of the safety element may include a positive temperature coefficient (PTC) element, a protection circuit module (PCM), a fuse, and a thermal cutoff (TCO) element.

Generally, a safety element, such as a PCM, is connected to a battery cell, including an anode terminal and a cathode terminal, via a conductive nickel plates by welding or soldering. For example, the nickel plates are connected to the electrode terminals of the battery cell by welding or soldering, a protection circuit board (PCB) is attached to one side of a double-sided tape, a protective tape is attached to the other side of the double-sided tape, and electrode tabs of the PCB and the nickel plates are connected to each other by welding in a state in which the PCB is in tight contact with the battery cell. In this way, the PCM is connected to the battery cell to manufacture a battery pack.

It is required for the PCM to be maintained in electrical connection with the electrode terminals of the battery cell and, at the same time, to be electrically isolated from other parts of the battery cell. To this end, insulative tapes are attached to various members, including the PCM. In addition, a sealed portion of a battery case is partially bent, and an insulative tape is attached thereon or a barcode is printed thereon. That is, the process is very complicated.

Since a plurality of insulative tapes or parts is required to achieve safe connection between the safety element and the battery cell as described above, a battery pack assembly process is complicated, and manufacturing cost is increased. Also, when external impact is applied to a battery pack, the PCM may be damaged or dimensional stability may be greatly lowered due to the use of the insulative tapes, which exhibit low mechanical strength.

DISCLOSURE

Technical Problem

It is an object of the present invention to provide a secondary battery pack that is capable of covering a protection circuit board of a secondary battery cell using an electrically insulative case, thereby protecting the protection circuit board from external impact, insulating the protection circuit board, and preventing electrode terminals of the secondary battery cell from being exposed outside.

It is another object of the present invention to provide a secondary battery pack that is capable of reducing the number of parts necessary to constitute the battery pack, thereby simplify an assembly process and exhibiting excellent structural stability.

It is another object of the present invention to provide a secondary battery pack configured to have a structure in which a protection circuit module including a protection circuit board and a case, in which the protection circuit board is disposed, is mounted to an outer circumference of a battery cell, thereby providing maximum capacity in the same standard.

It is a further object of the present invention to provide a protection circuit module that is capable of a protection circuit module that is capable of protecting a safety element from external impact, exhibiting dimensional stability, and preventing wrinkles from being formed at an outer face of a battery pack.

Technical Solution

A secondary battery pack according to an embodiment of the present invention includes a battery cell having an anode terminal and a cathode terminal formed at one face having a sealed surplus portion and a protection circuit module (PCM) electrically connected to the battery cell via the anode terminal and the cathode terminal.

In this embodiment, the PCM may include a board having a protection circuit formed thereon, the board being provided with an anode terminal connection part and a cathode terminal connection part connected to the anode terminal and the cathode terminal, respectively.

In this embodiment, the board may be coupled to the anode terminal and the cathode terminal of the battery cell via the anode terminal connection part and the cathode terminal connection part and may be mounted to the sealed surplus portion of the battery cell.

In this embodiment, the secondary battery pack may further include a frame mounted to the PCM and the battery cell so as to surround the PCM and the battery cell.

In this embodiment, the frame may be configured to have a structure to surround the PCM and thermally welded outer circumferences of the battery cell.

In this embodiment, the frame may be configured to have an open structure in which at least a portion of a surface of a main body of the battery cell is exposed outside in a state in which the frame is mounted to the PCM and the battery cell.

In this embodiment, the frame may be configured to have a structure including at least one support to supports a portion of a surface of a main body of the battery cell in a state in which the frame is mounted to the PCM and the battery cell.

In this embodiment, the frame may be formed in the shape of a box having a closed bottom.

In this embodiment, the frame may have at least one opening formed at a side or a bottom thereof.

In this embodiment, the frame may be configured to have a structure in which at least one face of the frame is protruded or extended to support a portion of a surface of a main body of the battery cell in a state in which the frame is mounted to the PCM and the battery cell.

In this embodiment, the battery cell may be a plate-shaped battery cell, and the anode terminal and the cathode terminal may be plate-shaped conductive members.

In this embodiment, the board may further include an external input and output terminal. The external input and output terminal may be formed at the board at which the anode terminal connection part and the cathode terminal connection part are formed via an interconnection part.

Also, the external input and output terminal may be formed on the board at which the anode terminal connection part and the cathode terminal connection part are formed. The frame may further include an opening, through which the external input and output terminal is drawn, formed at a face adjacent to the open face thereof. An example of the opening may be a slit type opening.

In this embodiment, the secondary battery pack may further include an insulative tape additionally attached to an electrode terminal exposure region of the sealed surplus portion. The insulative tape may be, for example, a double-sided tape.

In this embodiment, the battery cell may be configured to have a structure in which an electrode assembly, including cathodes, anodes, and separators respectively disposed between the cathodes and the anodes, is disposed in a battery case made of a laminate sheet including a metal layer and a resin layer in a sealed state.

In this embodiment, the board may be mounted so that the board is opposite to the face of the battery cell at which the sealed surplus portion is formed. In another embodiment, the board may be mounted perpendicularly to the face of the battery cell at which the sealed surplus portion is formed.

In this embodiment, the secondary battery pack may further include a nickel plate additionally mounted to one face of the cathode terminal, to which the cathode terminal connection part of the board is coupled, by ultrasonic welding.

In this embodiment, the secondary battery pack may further include a label to cover the battery cell. The label may be configured to have a structure to cover sealed outer circumferences of the battery cell.

A protection circuit module according to another embodiment of the present invention includes a protection circuit board having an anode terminal connection part and a cathode terminal connection part connected to an anode terminal and a cathode terminal of a battery cell, respectively, and a frame to surround the protection circuit board and outer circumferences of the battery cell.

In the protection circuit module according to this embodiment, the protection circuit board may be coupled to the anode terminal and the cathode terminal of the battery cell via the anode terminal connection part and the cathode terminal connection part and may be mounted to a sealed surplus portion formed at one face of the battery cell.

In the protection circuit module according to this embodiment, the frame may be configured to have an open structure in which a surface of a main body of the battery cell is exposed outside in a state in which the frame is mounted so as to surround the protection circuit board and outer circumferences of the battery cell.

In the protection circuit module according to this embodiment, the protection circuit board may further include an external input and output terminal coupled to the board at which the anode terminal connection part and the cathode terminal connection part are formed via an interconnection part. The frame may further include an opening, through which the interconnection part extends, formed at a face adjacent to the open face thereof. Also, the frame may include a slit type opening.

A method of manufacturing a secondary battery pack according to a further embodiment of the present invention includes a step of forming a battery cell configured to have a structure in which an electrode assembly, including cathodes, anodes, and separators respectively disposed between the cathodes and the anodes, is disposed in a battery case in a sealed state, one of sealed outer circumferences of the battery cell having a surplus portion, a step of exposing an anode terminal and a cathode terminal on the sealed surplus portion of the battery cell and mounting a protection circuit board, having an anode terminal connection part and a cathode terminal connection part connected to the anode terminal and the cathode terminal, respectively, to the sealed surplus portion, and a step of mounting a frame so that the frame receives the protection circuit board mounted to the sealed surplus portion and surrounds the outer circumferences of the battery cell.

Advantageous Effects

As is apparent from the above description, the secondary battery pack according to the present invention includes a frame to surround the PCM and the outer circumferences of the battery cell so that the PCM is fixedly mounted to the battery cell. Consequently, it is possible to protect and insulate the PCB and the outer circumferences of the battery cell. Also, it is possible to easily prevent the electrode terminals from being exposed outside without insulation of the electrode terminal through the use of additional members.

Also, the secondary battery pack according to the present invention is configured to have a structure in which the PCM is mounted to the sealed surplus portion of the battery cell. Consequently, it is possible to effectively protect the PCM and to greatly improve manufacturing efficiency, as compared with the conventional internal type secondary battery pack.

Furthermore, the secondary battery pack according to the present invention is configured to have a structure in which the PCB is mounted in the frame. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance, as compared with the conventional internal type secondary battery pack in which the PCM is insulated using a tape.

In addition, the secondary battery pack according to the present invention is configured to have a structure in which the PCB is mounted to the sealed surplus portion formed at the upper end of the battery cell. Consequently, it is possible to reduce the length of the sealed surplus portion and to increase the capacity of the secondary battery pack per unit volume, as compared with the conventional PCB mounting structure.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the embodiments will be described only for a better understanding of the present invention, and therefore, the scope of the present invention is not limited by the illustrated embodiments.

A secondary battery pack according to an embodiment of the present invention includes a battery cell having four sealed outer circumferences and a safety element mounted to a sealed outer circumference having a surplus portion, which is one of the outer circumferences. A safety element according to an embodiment of the present invention may include a first safety element and a second safety element. The first safety element may be a protection circuit, and the second safety element may be a positive temperature coefficient (PTC) element, a fuse, or a thermal cutoff (TCO) element. Also, the second safety element may be mounted in a protection circuit module (PCM) in the form of a part.

The safety element according to the embodiment of the present invention may be a PCM. The PCM may include a protection circuit board and a case, in which the protection circuit board is disposed. For the convenience of description, a PCM will be described as being adopted as the safety element, and the PCM will be described as including a protection circuit board (PCB) in this specification, to which, however, the safety element according to the embodiment of the present invention is not limited.

Figure 1:
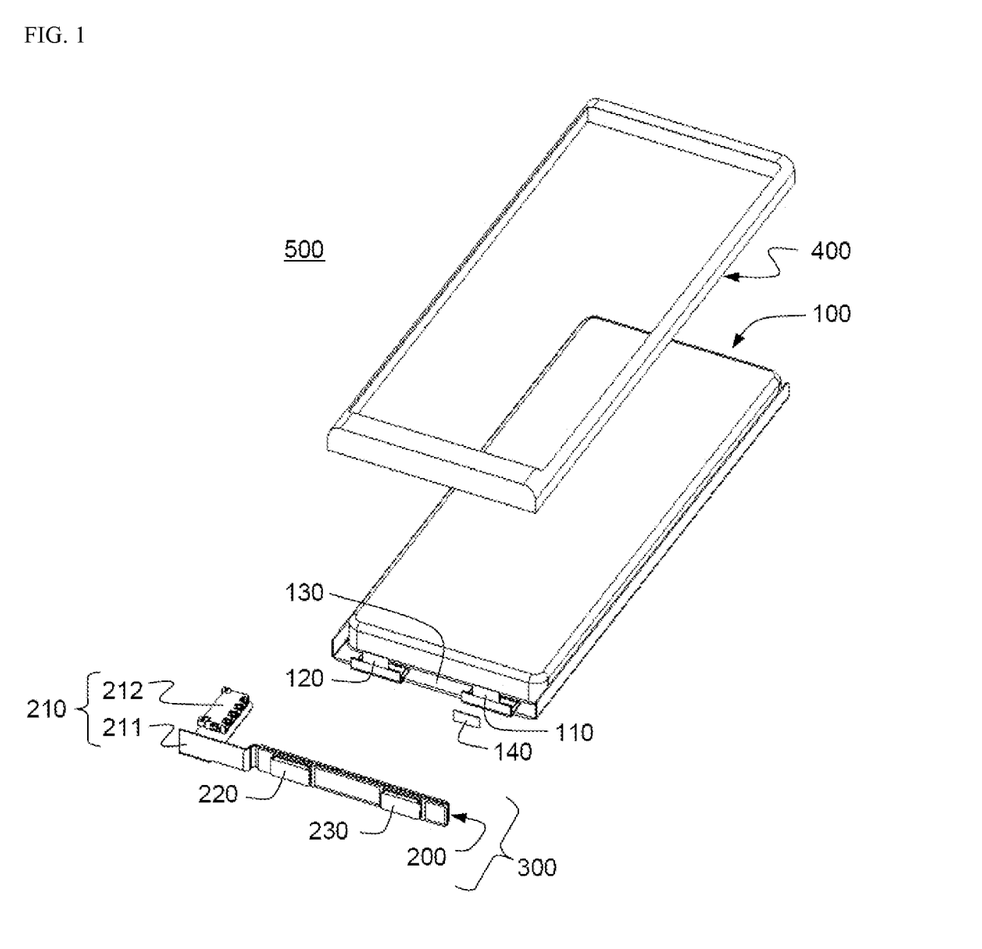
FIG. 1 is an exploded perspective view of a secondary battery pack according to an embodiment of the present invention.

Hereinafter, a secondary battery pack according to an embodiment of the present invention will be described with reference to FIG. 1. FIG. 1 typically shows an exploded perspective view of a secondary battery pack according to an embodiment of the present invention.

Referring to FIG. 1, a secondary battery pack 500 may include an anode terminal 120, a cathode terminal 110, a battery cell 100, a PCM 300, and a frame 400.

A battery cell 100 according to an embodiment of the present invention is a pouch-shaped battery cell configured so that an electrode assembly of a cathode/separator/anode structure is disposed in a battery case made of a laminate sheet including a metal layer and a resin layer in a sealed state, to which, however, the battery cell according to the embodiment of the present invention is not limited.

Referring to FIG. 1, the battery cell 100 includes a sealed surplus portion 130 formed at one face thereof and an anode terminal 120 and a cathode terminal 110 exposed to the sealed surplus portion 130. The term 'face' used in this specification indicates an arbitrary face of a tetrahedron with four faces, and is understood as including a side, a section, or an end. Also, in this specification, a sealed portion having a surplus space formed at one of the sealed outer circumferences formed when an electrode assembly is disposed in a battery case made of a laminate sheet in a sealed state is referred to as a sealed surplus portion 130. However, a person having ordinary skill in the art to which the present invention pertains will appreciate that the sealed surplus portion may be replaced by terms, such as a thermal welded surplus portion and a sealed terrace, as long as the specified terms have the same meaning as the sealed surplus portion.

An anode terminal 120 and a cathode terminal 110 according to an embodiment of the present invention are plate-shaped conductive members. The anode terminal 120 and the cathode terminal 110 are electrically connected to a PCB 200 of a PCM 300, which will hereinafter be described.

Referring to FIG. 1, the PCB 200 is a board including a protection circuit. The PCB may be referred to as a protection circuit board or simply a board. The PCB 200 may further include an anode terminal connection part 220 connected to the anode terminal 120 of the battery cell 100 and a cathode terminal connection part 230 connected to the cathode terminal 110 of the battery cell 100 on the board in addition to the protection circuit to control overcharge, overdischarge, and overcurrent of the battery. In addition to the protection circuit and the two connection parts 220 and 230, the PCB 200 may further include an external input and output terminal 210 connected to the board via an interconnection part 211 connected to one end of the board, as shown in FIG. 1.

An external input and output terminal 210 according to an embodiment of the present invention is not particularly restricted so long as the external input and output terminal can be electrically connected to the PCB 200 to supply current from an external device, such as a charger, to the battery cell 100 or to supply current from the battery cell 100 to an external device, such as a mobile phone, an MP3 player, etc. For example, the external input and output terminal 210 may be configured to have a plate structure having a connector 212 mounted to one end thereof.

Figure 8:
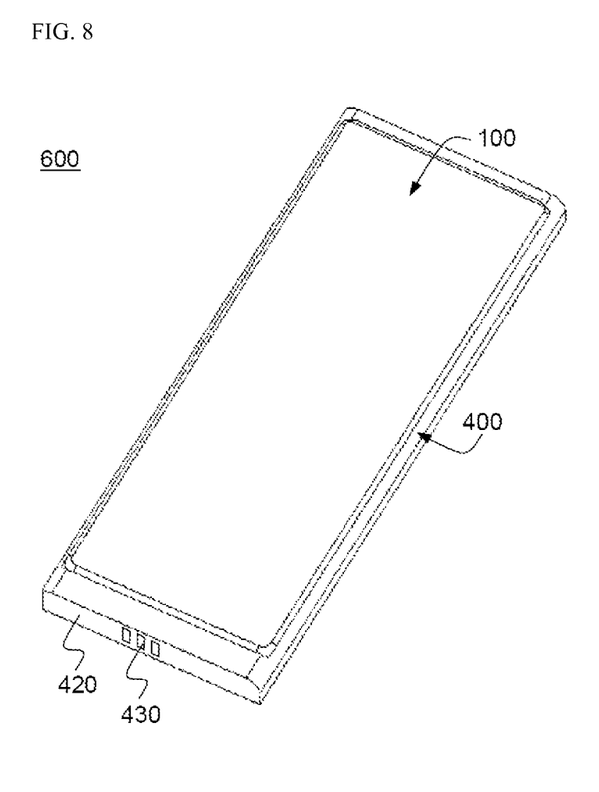
FIG. 8 is a perspective view of a secondary battery pack according to another embodiment of the present invention.

Also, unlike the embodiment shown in FIG. 1, the external input and output terminal may be formed on the board on which the anode terminal connection part and the cathode terminal connection part are formed without being connected to the PCB 200 via the interconnection part. A secondary battery pack with the above-stated construction is shown in FIG. 8. In a case in which an external input and output terminal is formed on a PCB, openings are formed at a region of a PCM case 420 (see FIG. 8), in which the PCB is disposed, corresponding to an external input and output terminal 430 (see FIG. 8). The external input and output terminal may be electrically connected to an external device through the openings.

An anode terminal connection part 220 according to an embodiment of the present invention may include a part coupled to the PCB 200 and an extension part that can be bent when the anode terminal connection part 220 is connected to the anode terminal 120 of the battery cell 100. In the same manner, a cathode terminal connection part 230 according to an embodiment of the present invention may include a part coupled to the PCB 200 and an extension part that can be bent when the cathode terminal connection part 230 is connected to the cathode terminal 110 of the battery cell 100.

As shown in FIG. 1, the external input and output terminal 210 according to the embodiment of the present invention is configured to have a plate structure having a connector 212 mounted to one end thereof, to which, however, the external input and output terminal 210 is not limited. Also, as shown in FIG. 1, the external input and output terminal 210 is configured to face in a direction opposite to a direction in which the anode terminal connection part 220 and the cathode terminal connection part 230 face, which, however, is only an example. According to another embodiment of the present invention, the external input and output terminal 210 may be configured to face in the same direction as a direction in which the anode terminal connection part 220 and the cathode terminal connection part 230 face. Also, the external input and output terminal may be located at the cathode terminal connection part side.

A frame 400 according to an embodiment of the present invention is configured to have an open structure to surround the PCB 200 and outer circumferences of the battery cell so that the surface of a main body of the battery cell is exposed outside. Consequently, dimensional stability of the frame 400 is high, and it is possible to greatly reduce mounting time and process. Here, the mounting time means time required for an assembly process of placing the PCB 200 and the battery cell in the frame 400 and assembling the PCB 200 and the battery cell with the frame 400. Reduction of the mounting time means reduction of time required for the assembly process, and therefore, it is possible to greatly simplify the process.

Figure 9:
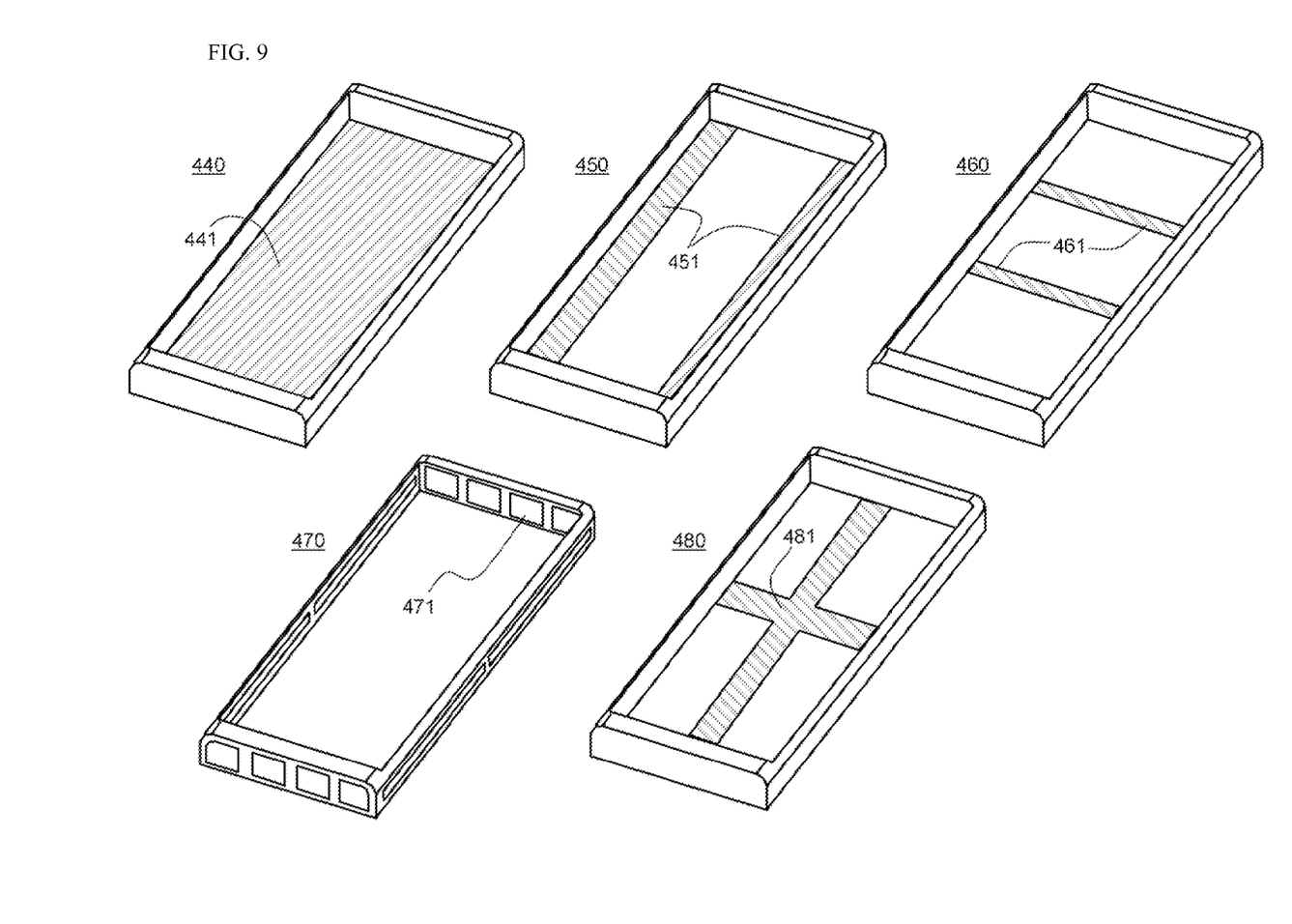
FIG. 9 is a series of perspective views showing a frame according to a further embodiment of the present invention.

The frame 400 may have a size sufficient to receive and surround the outer circumferences of the battery cell 100 the PCB 200 mounted on the sealed surplus portion 130 of the battery cell 100. Also, the frame may be configured to have various structures to receive the PCB and the batter cell. A person having ordinary skill in the art to which the present invention pertains will appreciate that, as shown in FIG. 9, the frame may be configured to have a structure having at least one support, by which the bottom of the frame supports the battery cell (for example, 440, 450, 460, 470, or 480 of FIG. 9), to have a box structure in which the bottom of the frame is closed (for example, 440 of FIG. 9), to have a structure in which openings are formed at faces of the frame (for example, 470 of FIG. 9), or to have a structure obtained by combining the above structures. Also, the frame may be configured to have a structure in which at least one face of the frame extends to further support the battery cell (for example, 450 of FIG. 9). In addition, in a case in which the PCB 200 includes the external input and output terminal 210 connected thereto via the interconnection part 211, as shown in FIG. 1, an opening, through which the external input and output terminal 210 is exposed, may be formed at a face of the frame 400 adjacent to the open face. For example, a slit type opening 410 (see FIG. 6) may be formed at the frame.

A secondary battery pack according to another embodiment of the present invention may be configured so that a safety element is further mounted between at least one of the electrode terminals, i.e. the anode terminal and/or the cathode terminal, of the battery cell and the PCB. In this case, the safety element may be disposed between, for example, the anode terminal of the battery and the PCB. The safety element is mounted in the PCM case together with the PCB so that the structural stability of the safety element is secured.

Consequently, it is possible to directly connect the cathode terminal of the battery cell to the cathode terminal connection part of the PCB and to connect one side of the safety element to the safety element connection part disposed on the same face of the PCB in a state in which the anode terminal is connected to the other side of the safety element without shape deformation or further use of additional members, and therefore, it is possible to stably mount the safety element, the structural strength is low, to the PCB, thereby reducing a defect rate in a manufacturing process and improving manufacturing efficiency.

The safety element is a member which interrupts current when the temperature of the battery cell is increased to secure safety. For example, the safety element may be a PTC element, the resistance of which increases as the temperature of the battery cell is increased, or a fuse, which is broken when the temperature of the battery cell is increased. However, the safety element is not limited to the PTC element and the fuse.

Hereinafter, a method of manufacturing the secondary battery pack shown in FIG. 1 will be described with reference to FIGS. 2 to 7. FIGS. 2 to 7 are various perspective views of a secondary battery pack illustrating a method of manufacturing the secondary battery pack.

Figure 2:
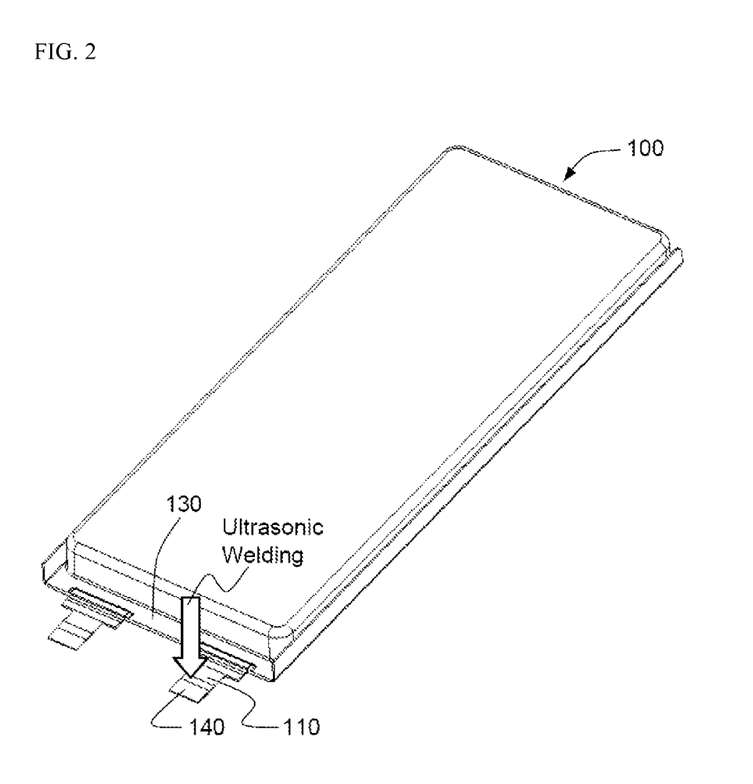
FIGS. 2 to 7 are perspective views showing a method of manufacturing the secondary battery pack of FIG. 1.

Referring first to FIG. 2, a surplus portion, i.e. a sealed surplus portion 130, is formed at one of sealed faces of a battery cell 100, and an anode terminal 120 and a cathode terminal 110 of the battery cell 100 are disposed on the sealed surplus portion 130. The sealed surplus portion 130 has a size sufficient to receive a PCB 200. A person having ordinary skill in the art to which the present invention pertains will appreciate that the size of the sealed surplus portion 130 may be properly adjusted based on the capacity and shape of the battery cell.

Subsequently, as shown in FIG. 2, a nickel plate 140 may be coupled to a portion of the cathode terminal 110, for example, by ultrasonic welding. In a case in which the nickel plate 140 is mounted to the cathode terminal 110, it is possible to prevent deterioration of weldability between the cathode terminal, made of aluminum, of the battery cell and a PCB cathode terminal connection part made of nickel due to different properties.

Also, in another embedment of the present invention, as previously described, an additional safety element, such as a PTC element, may be selectively mounted between the anode terminal 120 and an anode terminal connection part 220 to secure stability.

Figure 3:
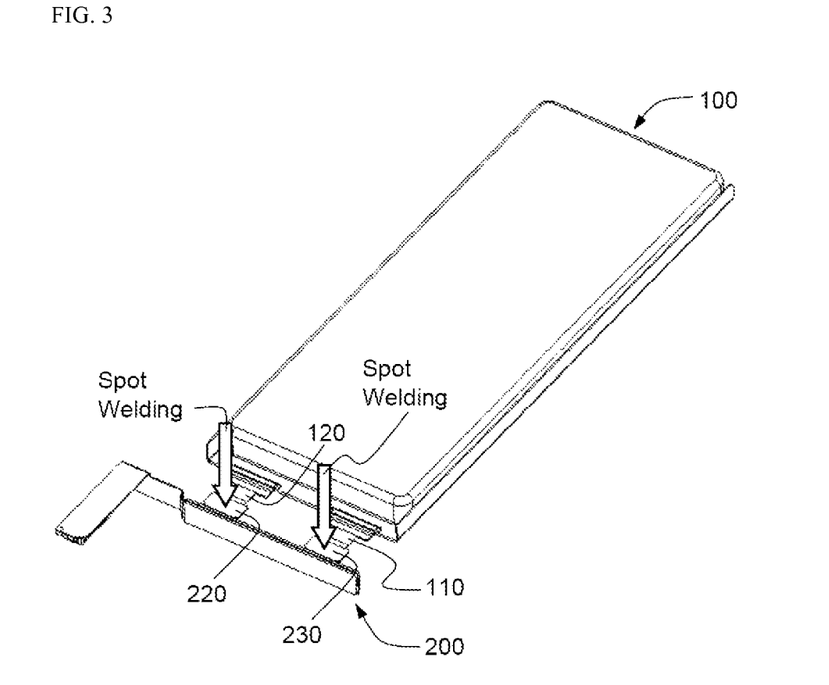

Subsequently, as shown in FIG. 3, the anode terminal connection part 220 and a cathode terminal connection part 230 formed at the PCB 200 are welded to the anode terminal 120 and the cathode terminal 110 of the battery cell 100, respectively, for example, by spot welding. In a case in which the nickel plate 140 is welded to the cathode terminal 110 as shown in FIG. 2, the cathode terminal connection part 230 is welded to the nickel plate 140.

Since the anode terminal connection part 220 and the cathode terminal connection part 230 each include a part coupled to the PCB 200 and a bendable extension part as described above, the anode terminal connection part 220 and the cathode terminal connection part 230 of the PCB 200 may be coupled to the anode terminal 120 and the cathode terminal 110 of the battery cell 100, respectively, by welding so that the PCB 200 is opposite to one face of the battery cell 100 at which the sealed surplus portion 130 is formed, as can be seen from FIG. 3.

Figure 4:
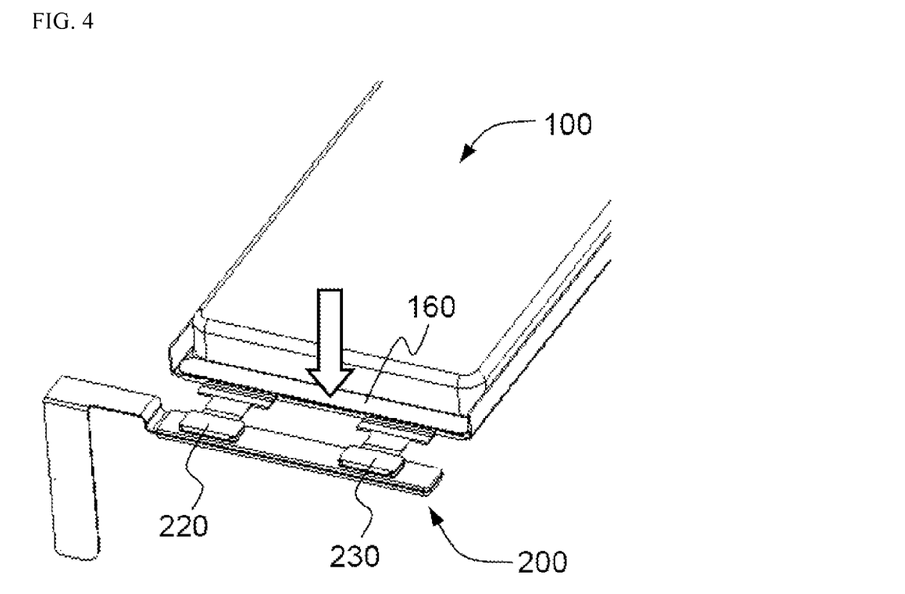

Referring to FIG. 4 together with FIG. 1, after the anode terminal connection part 220 and the cathode terminal connection part 230 are bent, an adhesive tape 160, serving as an insulation tape, may be attached to an electrode terminal exposure region of the sealed surplus portion 130 of the main body of the battery cell 100. In a case in which the insulation tape is further attached to the electrode terminal exposure region of the sealed surplus portion 130 as described above, it is possible to more effectively improve insulativity of the electrode terminal exposure region. Also, in a case in which the insulation tape is a double-sided tape, the double-side tape provides coupling force between the PCM case and the sealed surplus portion when the PCM case is mounted to the PCB, thereby further improving structural stability.

As shown in FIG. 4, the PCB 200 is disposed in a direction parallel to the battery cell 100 so that the anode terminal connection part 220 and the cathode terminal connection part 230 of the PCB 200 face upward, and an external input and output terminal 210 of the PCB 200 faces downward. Also, the PCB may be disposed in a direction perpendicular to the battery cell.

Figure 5:
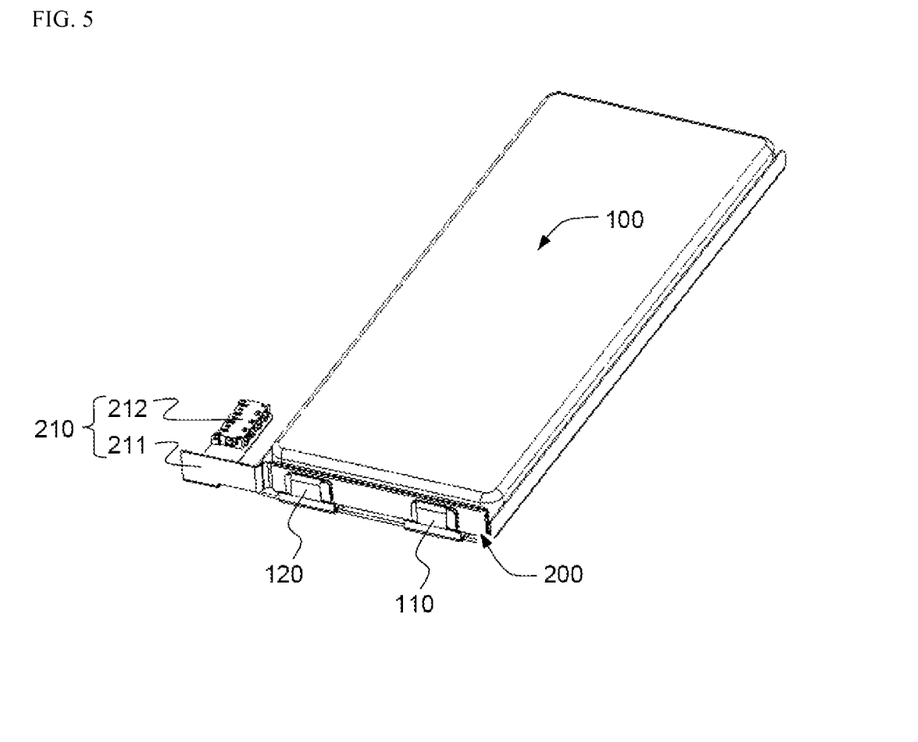

Referring to FIG. 5, in order to mount the PCB 200, connected to the anode terminal 120 and the cathode terminal 110 of the battery cell 100 via the anode terminal connection part 220 and the cathode terminal connection part 230, to the sealed surplus portion 130 of the battery cell 100, first, one face of the PCB 200 at which the anode terminal connection part and the cathode terminal connection part is bent so that the face of the PCB 200 is opposite to one face of the battery cell 100 at which the sealed surplus portion 130 is formed, and the bendable extension parts of the anode terminal connection part 220 and the cathode terminal connection part 230 are bent so that the PCB 200 is located on the coupling portions between the anode terminal 120 and the anode terminal connection part 220 and between the cathode terminal 110 and the cathode terminal connection part 230. Subsequently, the anode terminal 120 and the cathode terminal 110 is bent toward the face of the battery cell at which the sealed surplus portion 130 is formed so that the PCB 200 is mounted to the sealed surplus portion 130. At this time, the other face of the PCB 200 opposite to the face of the PCB at which the anode terminal connection part and the cathode terminal connection part are formed is opposite to one face of the battery cell 100, and the anode terminal 120 and the cathode terminal 110 of the battery cell 100 face outside the battery cell 100.

When the PCB 200 is mounted to the sealed surplus portion 130 formed at one face of the battery cell 100 as described above, the PCB 200 is mounted perpendicularly to the sealed surplus portion 130. In a case in which it is difficult for the sealed surplus portion 130 to have a sufficient size, therefore, the size of the PCB 200 may be reduced.

Figure 6:
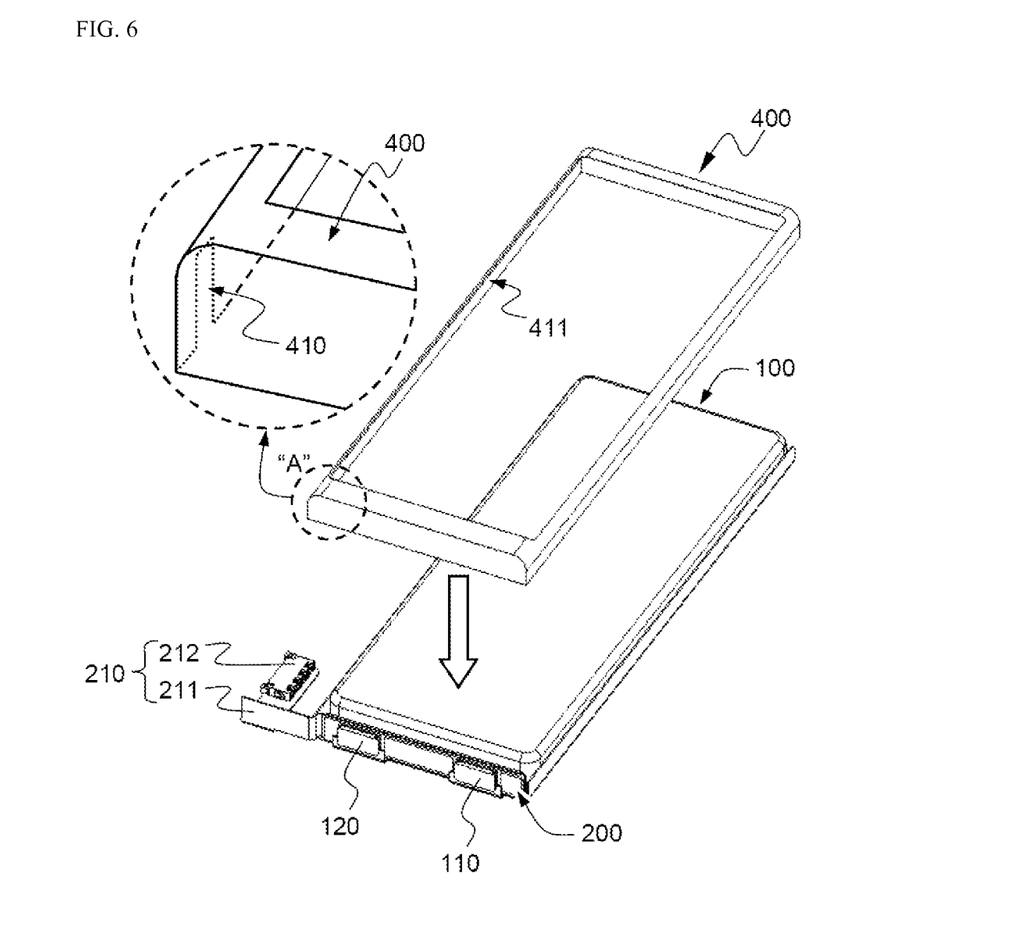

A process of surrounding the PCB 200 mounted to the sealed surplus portion 130 of the battery cell 100 and the outer circumferences of the battery cell 100 using the frame 400 will be described with reference to FIGS. 6 and 7. As previously described in connection with FIG. 1, the frame 400 is configured to have an open structure to surround the PCB 200 and the outer circumferences of the battery cell 100 so that the surface of the main body of the battery cell 100 is exposed outside. Also, in a case in which an external input and output terminal 210 is connected to the connection parts of the PCB 200 via an interconnection part as shown in FIG. 6, an opening, e.g. a slit type opening 410, may be formed at one face of the frame 400 corresponding to the interconnection part 211 of the PCB 200 so that the external input and output terminal 210 is exposed outside. Since the interconnection part 211 of the PCB 200 extends through the slit type opening 410, the external input and output terminal 210 connected to the interconnection part 211 is exposed outside.

As can be seen from FIG. 6, the shape or size of the frame 400 may be properly adjusted based on the sealed surplus portion 130 the outer circumferences of the battery cell 100 so that the frame 400 can receive the PCB 200 and, at the same time, the outer circumferences of the battery cell 100 in the sealed surplus portion 130. Also, the shape and size of the slit type opening 410 formed at one face of the frame 400 are not limited to those shown in FIG. 6. That is, the shape and size of the slit type opening 410 are not particularly restricted so long as the interconnection part 211 of the external input and output terminal 210 can extend through the slit type opening 410.

Also, the coupling between the frame 400 and the PCB 200 and between the frame 400 and the outer circumferences of the battery cell 100 may be achieved by attaching an adhesive material to the inside 411 of the frame 400. The adhesive material is interposed between two members to couple the two members to each other. The adhesive material may be, for example, a double-sided adhesive tape, to which, however, the adhesive material is not limited.

Figure 7:
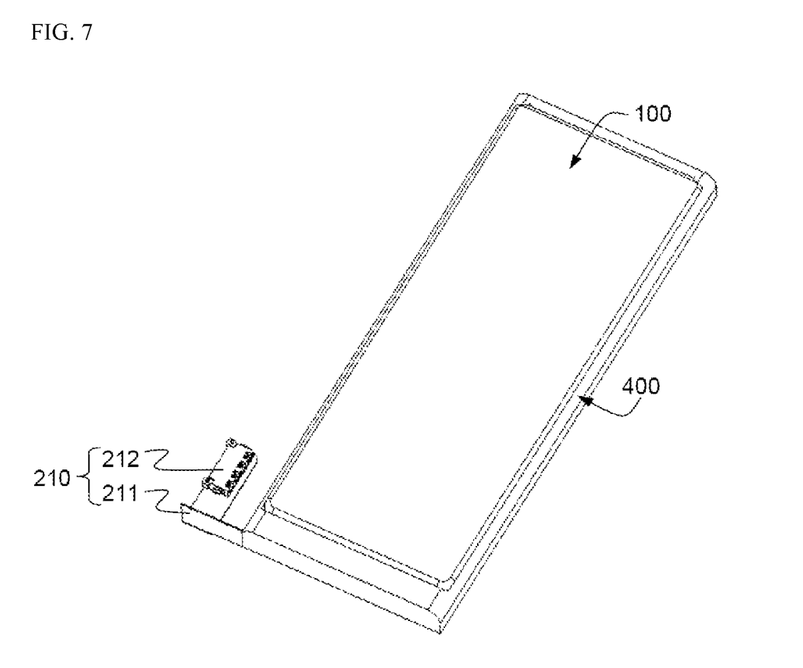

FIG. 7 is a view showing a state in which the PCB 200 mounted to sealed surplus portion 130 of the battery cell 100 and the outer circumferences of the battery cell 100 are disposed in the frame 400. The frame 400 according to the present invention may be configured to surround the PCB 200 mounted to sealed surplus portion 130 and the outer circumferences of the battery cell 100 so that the external input and output terminal is exposed outside. For example, as shown in FIG. 7, the frame 400 may be configured to have an open structure to surround the PCB 200 and the outer circumferences of the battery cell 100 so that the surface of the main body of the battery cell 100 is exposed outside.

In a case in which the frame 400 is mounted to the battery cell, it is possible to stably fix the sealed outer circumferences of the battery cell to the main body of the battery cell while maintaining the overall insulation state, thereby more stably securing the electrical connection state between the electrode terminals of the battery cell and the PCB.

FIG. 8 is a perspective view of a secondary battery pack according to another embodiment of the present invention configured so that an external input and output terminal is mounted to a PCB. Referring to FIG. 8, as previously described, a secondary battery pack 600 is configured to have a structure in which an external input and output terminal 430 is formed at one face of the PCB (not shown) so that the external input and output terminal 430 is exposed outside through an upper end 430 of the frame.

As is apparent from the above description, the secondary battery pack according to the present invention is configured so that the PCM, including the protection circuit board electrically connected to the cathode terminal and the anode terminal of the battery cell, is mounted to the sealed surplus portion formed at one face of the battery cell. Consequently, it is possible to effectively protect the PCM and to greatly reduce the number of parts constituting the secondary battery pack, thereby greatly improving manufacturing efficiency, as compared with the conventional secondary battery pack.

Also, the secondary battery pack according to the present invention is configured so that the protection circuit board is disposed in the electrically insulative frame. Consequently, it is possible to protect and insulate the PCM including the protection circuit board. Also, it is possible to easily prevent the electrode terminals from being exposed outside without insulation of the electrode terminals through the use of additional members.

Furthermore, the secondary battery pack according to the present invention is configured so that the protection circuit board and the outer circumferences of the battery cell are mounted in the frame. Consequently, it is possible to easily manufacture the secondary battery pack, to relatively reduce a defect rate, and to configure the secondary battery pack so that the secondary battery pack has no wrinkles formed at the outer face thereof, i.e. a neat and clean external appearance, as compared with the conventional secondary battery pack in which the PCM is insulated using a tape.

In addition, the secondary battery pack according to the present invention is configured so that the protection circuit board is mounted to the sealed surplus portion formed at one face of the battery cell. Consequently, it is possible to reduce the length of the sealed surplus portion and to increase the capacity of the battery pack per unit volume, as compared with the conventional secondary battery pack.

Meanwhile, in a general process of assembling the secondary battery pack, the connection members and the PCM are coupled, and an insulative tape is attached at each step, to the PCM assembly is mounted to the battery cell, as previously described. That is, the PCM assembly is mounted to the battery cell using a plurality of parts with the result that a plurality of processes is required, and structural stability as well as mechanical strength is low.

On the other hand, the protection circuit module according to the present invention is configured to have a structure in which the protection circuit board and the outer circumferences of the battery cell are mounted in the frame, and therefore, it is possible to improve structural stability of the battery pack, to greatly simplify the process of manufacturing the battery pack, to secure excellent insulativity, and to maximize the capacity of the battery cell in the battery pack having the same standard as the conventional battery pack.

Also, in the manufacturing method according to the present invention, it is possible to protect and insulate the PCM and the outer circumferences of the battery cell using the frame without an additional member, such as a label or an insulative tape. Also, the protection circuit board is electrically connected to the electrode terminals, the electrode terminals are bent, and then the protection circuit board is mounted in the frame with the result that no exposed region is formed during the bending process, and therefore, an additional insulative member is not required.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
    a battery cell having a main body, an anode terminal and a cathode terminal, the main body having a top major surface, a bottom major surface and sidewalls extending between the top major surface and the bottom major surface;
    a protection circuit module (PCM) electrically connected to the battery cell via the anode terminal and the cathode terminal;
    a frame mounted to the PCM and the battery cell, the frame having a first pair of sidewalls and a second pair of sidewalls to surround the PCM and the battery cell, each sidewall of the frame having a top edge and a bottom edge to form a top edge and bottom edge of the frame; and
    a bottom formed by the bottom edge of the frame, the bottom having four openings formed by a support extending inwardly from the bottom edge of the frame, the support having a first member extending between the first pair of sidewalls and a second member extending between the second pair of sidewalls,
    wherein the first member crosses the second member at a point between the first pair of sidewalls and between the second pair of sidewalls,
    wherein the frame does not extend over the top major surface of the battery cell,
    wherein the first pair of sidewalls and the second pair of sidewalls extend over an entire height of the battery cell sidewalls,
    wherein the PCM comprises a board having a protection circuit formed thereon, the board being provided with an anode terminal connection part and a cathode terminal connection part connected to the anode terminal and the cathode terminal, respectively,
    wherein the board is coupled to the anode terminal and the cathode terminal of the battery cell via the anode terminal connection part and the cathode terminal connection part,
    wherein the board further comprises an external input and output terminal,
    wherein the external input and output terminal is connected to the board via an interconnection part connected to one end of the board,
    wherein the interconnection part is configured to have a plate structure,
    wherein the frame further comprises a first opening, through which the interconnection part extends,
    wherein the external input and output terminal is connected to a portion of the interconnection part extending outside the frame,
    wherein the battery cell is configured to have a structure in which an electrode assembly, comprising cathodes, anodes, and separators respectively disposed between the cathodes and the anodes, and is disposed in a battery case made of a laminate sheet comprising a metal layer and a resin layer in a sealed state, and
    wherein the first opening is a slit in which one side of the slit corresponding to a mounting direction of the frame is opened.

2. The secondary battery pack according to claim 1, wherein the frame is configured to have a structure to surround the PCM and thermally welded outer circumferences of the battery cell.

3. The secondary battery pack according to claim 1, wherein the frame is configured to have an open structure in which at least a portion of a surface of the main body of the battery cell is exposed outside in a state in which the frame is mounted to the PCM and the battery cell.

4. The secondary battery pack according to claim 1, wherein the battery cell is a plate-shaped battery cell, and the anode terminal and the cathode terminal are plate-shaped conductive members.

5. The secondary battery pack according to claim 1, further comprising an insulative tape additionally attached to an electrode terminal exposure region of a sealed surplus portion of the battery cell.

6. The secondary battery pack according to claim 5, wherein the insulative tape is a double-sided tape.

7. The secondary battery pack according to claim 1, wherein the board is mounted so that the board is opposite to the face of the battery cell at which a sealed surplus portion of the battery cell is formed.

8. The secondary battery pack according to claim 1, further comprising a nickel plate additionally mounted to one face of the cathode terminal, to which the cathode terminal connection part of the board is coupled, by ultrasonic welding.

9. The secondary battery pack according to claim 1, further comprising a label to cover the battery cell.

10. The secondary battery pack according to claim 9, wherein the label is configured to have a structure to cover sealed outer circumferences of the battery cell.

\* \* \* \* \*